United States Patent
Bost et al.

(10) Patent No.: US 10,229,473 B2
(45) Date of Patent: *Mar. 12, 2019

(54) ACCELERATED FRAME RATE ADVERTISING-PRIORITIZED VIDEO FRAME ALIGNMENT

(71) Applicant: International Business Machines Corporation, Armonk, NY (US)

(72) Inventors: Nathan A. Bost, Durham, NC (US); Paul P. Mariduena, Morrisville, NC (US); Adrian X. Rodriguez, Durham, NC (US); Eric M. Woods, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/693,124

(22) Filed: Aug. 31, 2017

(65) Prior Publication Data

US 2017/0365035 A1   Dec. 21, 2017

Related U.S. Application Data

(63) Continuation of application No. 14/718,405, filed on May 21, 2015, now Pat. No. 9,786,029, which is a
(Continued)

(51) Int. Cl.
*G06T 1/60* (2006.01)
*H04N 21/234* (2011.01)
(Continued)

(52) U.S. Cl.
CPC .............. *G06T 1/60* (2013.01); *G09G 5/006* (2013.01); *H04N 21/2387* (2013.01);
(Continued)

(58) Field of Classification Search
CPC ................ H04N 21/812; H04N 19/46; H04N 21/47217; H04N 21/23424;
(Continued)

(56) References Cited

U.S. PATENT DOCUMENTS 5,717,816 A * 2/1998 Boyce ................ H04N 21/4147
375/E7.013
6,909,837 B1   6/2005 Unger
(Continued)

FOREIGN PATENT DOCUMENTS

EP   1132835 A1   9/2001
EP   1580757 A2   9/2005
(Continued)

OTHER PUBLICATIONS

IBM, List of IBM Patents or Patent Applications Treated as Related, Applicant Appendix, Aug. 31, 2017, pp. 1-2, the contents of which are incorporated herein by reference in their entirety.
(Continued)

*Primary Examiner* — Nathan J Flynn
*Assistant Examiner* — Cynthia M Fogg
(74) *Attorney, Agent, or Firm* — Lee Law, PLLC; Christopher B. Lee

(57) ABSTRACT

In response to detection of a selection of an accelerated frame rate during decoding of video content, encoded accelerated frame rate decoding priority data values assigned to individual prioritized video frames of the video content are identified. A prioritized video frame subset of the individual prioritized video frames of the video content to decode that yields a maximized cumulative set of the assigned encoded accelerated frame rate decoding priority data values is determined based upon differences among the assigned encoded accelerated frame rate decoding priority data values and the selected accelerated frame rate.

20 Claims, 5 Drawing Sheets

Related U.S. Application Data continuation of application No. 14/451,846, filed on Aug. 5, 2014, now Pat. No. 9,786,028.

(51) Int. Cl.
*H04N 21/2387* (2011.01)
*H04N 21/81* (2011.01)
*G09G 5/00* (2006.01)

(52) U.S. Cl.
CPC ..... *H04N 21/23424* (2013.01); *H04N 21/812* (2013.01); *G06T 2200/16* (2013.01); *G09G 2340/0435* (2013.01); *G09G 2352/00* (2013.01); *G09G 2360/121* (2013.01)

(58) Field of Classification Search
CPC ............ H04N 21/2387; H04N 9/8042; H04N 21/8455; H04N 21/23439; G06T 1/60; G09G 5/006
USPC ....................................................... 725/32
See application file for complete search history.

(56) References Cited

U.S. PATENT DOCUMENTS

| | | | |
|---|---|---|---|
| 7,873,261 B2 | 1/2011 | Tischer | |
| 8,116,616 B2 | 2/2012 | Plotnick et al. | |
| 8,107,786 B2 | 3/2012 | Sardera | |
| 2002/0144262 A1* | 10/2002 | Plotnick | G11B 27/005 |
| | | | 725/32 |
| 2003/0037330 A1 | 2/2003 | Makofka | |
| 2004/0103429 A1 | 5/2004 | Carlucci et al. | |
| 2005/0271361 A1 | 12/2005 | Aoki | |
| 2006/0090009 A1 | 4/2006 | Gopalakrishnan et al. | |
| 2007/0025688 A1* | 2/2007 | Pejhan | H04N 5/783 |
| | | | 386/344 |
| 2008/0163289 A1* | 7/2008 | Keys | H04N 5/76 |
| | | | 725/32 |
| 2008/0193102 A1* | 8/2008 | Tischer | H04N 5/783 |
| | | | 386/287 |
| 2010/0172626 A1 | 7/2010 | Lee et al. | |
| 2015/0296275 A1* | 10/2015 | MacLeod | H04N 21/8455 |
| | | | 725/32 |
| 2016/0042490 A1 | 2/2016 | Bost et al. | |
| 2016/0044343 A1 | 2/2016 | Bost et al. | |

FOREIGN PATENT DOCUMENTS

| | | |
|---|---|---|
| EP | 1730957 B1 | 6/2010 |
| WO | 2007120337 A2 | 10/2007 |

OTHER PUBLICATIONS

United States Patent and Trademark Office, Office Action for U.S. Appl. No. 14/451,846, dated Jul. 28, 2016, pp. 1-30, Alexandria, VA, USA.

United States Patent and Trademark Office, Office Action for U.S. Appl. No. 14/451,846, dated Jan. 25, 2017, pp. 1-27, Alexandria, VA, USA.

United States Patent and Trademark Office, Notice of Allowance for U.S. Appl. No. 14/451,846, dated Jun. 5, 2017, pp. 1-20, Alexandria, VA, USA.

United States Patent and Trademark Office, Office Action for U.S. Appl. No. 14/718,405, dated Jul. 19, 2016, pp. 1-22, Alexandria, VA, USA.

United States Patent and Trademark Office, Office Action for U.S. Appl. No. 14/718,405, dated Jan. 25, 2017, pp. 1-20, Alexandria, VA, USA.

United States Patent and Trademark Office, Notice of Allowance for U.S. Appl. No. 14/718,405, dated Jun. 5, 2017, pp. 1-16, Alexandria, VA, USA.

\* cited by examiner

ACCELERATED FRAME RATE ADVERTISING-PRIORITIZED VIDEO FRAME ALIGNMENT

BACKGROUND

The present invention relates to audio/video content playback. More particularly, the present invention relates to accelerated frame rate advertising-prioritized video frame alignment.

Video content may be captured for storage and playback as a sequence of distinct video "frames" of still and/or moving visual events. Many industry standards exist for digital video encoding that define various compression techniques that reduce video content storage and transmission requirements. Video frame rates, which may be referred to as frames per second, also vary with different video capture and rendering standards.

SUMMARY

A method includes by a processor in response to detection of a selection of an accelerated frame rate during decoding of video content: identifying encoded accelerated frame rate decoding priority data values assigned to individual prioritized video frames of the video content; and determining, based upon differences among the assigned encoded accelerated frame rate decoding priority data values and the selected accelerated frame rate, a prioritized video frame subset of the individual prioritized video frames of the video content to decode that yields a maximized cumulative set of the assigned encoded accelerated frame rate decoding priority data values.

A system includes an input device; and a processor programmed to, in response to detection of a selection via the input device of an accelerated frame rate during decoding of video content: identify encoded accelerated frame rate decoding priority data values assigned to individual prioritized video frames of the video content; and determine, based upon differences among the assigned encoded accelerated frame rate decoding priority data values and the selected accelerated frame rate, a prioritized video frame subset of the individual prioritized video frames of the video content to decode that yields a maximized cumulative set of the assigned encoded accelerated frame rate decoding priority data values.

A computer program product includes a computer readable storage medium having computer readable program code embodied therewith, where the computer readable program code when executed on a computer causes the computer to, in response to detection of a selection of an accelerated frame rate during decoding of video content: identify encoded accelerated frame rate decoding priority data values assigned to individual prioritized video frames of the video content; and determine, based upon differences among the assigned encoded accelerated frame rate decoding priority data values and the selected accelerated frame rate, a prioritized video frame subset of the individual prioritized video frames of the video content to decode that yields a maximized cumulative set of the assigned encoded accelerated frame rate decoding priority data values.

DETAILED DESCRIPTION

Figure 1:
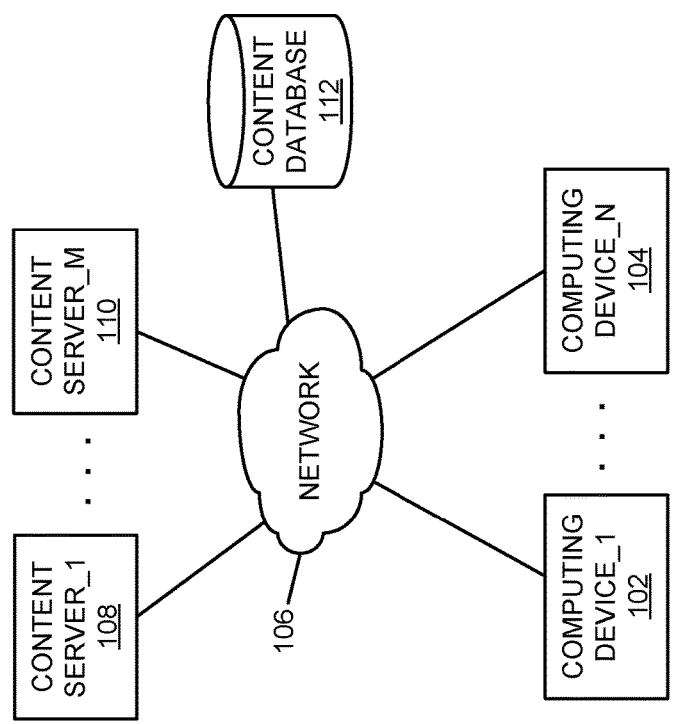
FIG. 1 is a block diagram of an example of an implementation of a system for accelerated frame rate advertising-prioritized video frame alignment according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides accelerated frame rate advertising-prioritized video frame alignment. The present technology applies to advertising content associated with advertising timeslots within other audio/video content, such as television shows, movies, sporting events, news broadcasts, and other forms of audio/video content (alternatively referred to as "video content" herein for brevity). The present technology allows advertisers to define individual advertising video frame priorities within advertisements. Different frame priorities may be defined for different individual frames of video content based upon available accelerated frame rate options (e.g., available fast-forward or rewind rates). Further, subsets of available video frames for rendering at different accelerated frame rates may be defined using equal priorities, or the subsets of frames may be determined using priority threshold analysis in association with accelerated frame rate operations. The present technology evaluates these advertiser-defined frame priorities across available advertising video frames, advertising timeslots, and user-selectable accelerated frame rate options.

In response to a user-selected accelerated frame rate, a quantity of individual prioritized video frames of a video advertisement to render during the accelerated frame rate is determined based upon a selected accelerated frame rate. Accelerated frame rate rendering priority values assigned to the individual prioritized video frames of the video advertisement are identified. Based upon differences among the identified accelerated frame rate rendering priority values assigned to the individual prioritized video frames, a prioritized video frame subset of the individual prioritized video frames equal in number to the determined quantity of individual prioritized video frames of the video advertisement is determined that yields a maximized cumulative set of the identified accelerated frame rate rendering priority values. As such, advertising impact during the selected/detected accelerated frame rate may be improved by selection of highest-priority advertising frames from available prioritized frames of the advertisement. The prioritized video frame subset of individual prioritized advertising video frames defined with the highest priorities across the advertisement content for the selected accelerated frame rate may be re-distributed within available accelerated frame rate advertising timeslots and time-aligned periodically during the time interval to improve advertising product/service promotion during the accelerated frame rate time period.

It should be noted that the number of advertising video frames selected and prioritized is not confined to any particular periodicity. An advertiser may specify a single frame to be aligned at any suitable timeslot and displayed during any available accelerated frame rate, or may specify multiple frames with the same or different priorities. To avoid blank un-rendered display between timeslot-aligned prioritized frames, the rendered prioritized frames may be rendered at a designated frame timeslot and the display of the rendered timeslot-aligned frames may be held constant throughout a designated portion of the advertising time interval until the next prioritized frame time occurs, at which time the next frame in the prioritized subset of frames may be rendered. Again, as described above, even a single frame may be specified for display during an entire advertising time period. As such, the present technology provides a granular prioritization approach that allows advertisers flexibility in determining which frame(s) are rendered during a particular advertising time period during an accelerated frame rate operation.

It should further be noted that the phrases "accelerated frame rate," "increased rate video playback," and similar terms as used herein refer to an increased video rendering rate in either a forward direction or a reverse direction. As such, fast-forward and fast-reverse/fast-rewind operations are represented by the respective phrases and similar terms as used herein.

Example accelerated frame rate options that may be made available to users of a given video rendering platform include options such as two times (2×) a standard frame rate, three times (3×) a standard frame rate, and other accelerated frame rates. Again, the accelerated frame rate options may be utilized in either a fast-forward and fast-reverse/fast-rewind direction.

As a first example approach for implementation of the present technology, each advertisement (e.g., commercial) may be represented for purposes of prioritization as a sequence of "intracoded" frames (I-Frames). I-Frames are fully-encoded frames that, as described in more detail below, do not rely upon any other frame's data content to be decoded accurately. As such, I-Frames represent example frame types that may be leveraged to efficiently prioritize frames for accelerated frame rate rendering.

Each I-Frame may be assigned and encoded with a priority by the advertiser. Priorities may be assigned as integer values (e.g., 1, 2, 3, etc.) or priorities may be assigned within a numeric decimal range (e.g., from 0 to 1). The numeric decimal range is used for the examples herein. It is understood that other forms of identification and specification of priorities are possible, and that all such forms of identification and specification of priorities are considered within the scope of the present subject matter.

During fast-forward or fast-rewind operations, only a subset of frames may be displayed. The subset of frames selected for display may be determined based upon each frame's assigned/defined priority. Higher priority frames may be selected for display before lower priority frames to identify a subset of frames for rendering based upon the available and/or specified/selected accelerated frame rate. If the subset of selected frames for a particular advertising time period/interval and the specified/selected accelerated frame rate becomes full when selecting frames of equal or higher priority, frames may be selected at regular, distributed intervals, with other frames omitted from the selected subset of frames.

The following Table (1) represents a video frame sequence that includes ten (10) I-Frames distributed across ten (10) equivalently-spaced timeslots for purposes of example. Each I-Frame has the following assigned priorities:

TABLE 1

Example I-Frame Sequence with Assigned Priorities

| | TIMESLOT | | | | | | | | | |
|---|---|---|---|---|---|---|---|---|---|---|
| | 1 | 2 | 3 | 4 | 5 | 6 | 7 | 8 | 9 | 10 |
| FRAME | 1 | 2 | 3 | 4 | 5 | 6 | 7 | 8 | 9 | 10 |
| PRIORITY | 0.0 | 0.5 | 0.0 | 0.5 | 0.0 | 0.0 | 0.75 | 0.5 | 0.0 | 1.0 |

As can be seen from Table (1), I-Frames one (1), three (3), five (5), six (6), and nine (9) have an assigned priority of zero (0.0). I-Frames two (2), four (4), and eight (8) have an assigned priority of zero point five or fifty percent (0.5 or 50%). I-Frame seven (7) has an assigned priority of zero point seventy-five or seventy-five percent (0.75 or 75%), and I-Frame ten (10) has an assigned priority of one or one hundred percent (1.0 or 100%).

For purposes of the present example, it is presumed that the I-Frames are evenly distributed within the original advertisement video content. As such, it is also presumed that inter-frame time is equal between each of the designated I-Frames, and that the respective frame numbers may also be considered a relative time of rendering of the respective I-Frames during normal/standard frame rate rendering of the advertising content. It is further presumed that during an accelerated frame rate operation, selected prioritized frames will be evenly distributed within the accelerated advertising time period for user viewing factor considerations, such as equal display time of each frame and a maximum time for the user to view each prioritized/selected frame, though as described elsewhere below higher-priority frames may be displayed for longer time periods (e.g., by being rendered across additional timeslots during frame skipping) to improve advertising impact of these particular frames.

During standard frame rate rendering, all of the I-Frames (and the associated preceding and succeeding frames—not shown) may be displayed in sequential order beginning with I-Frame one (1) through I-Frame ten (10). As such, the assigned priorities may be omitted from consideration during normal frame rate rendering.

However, during accelerated frame rate rendering, the number of available frames divided by the frame rate may be used to determine how many frames to select based upon the assigned priorities. For example, with ten (10) frames available within the present example, for an accelerated frame rate of two times (2×) the standard frame rate, the number of frames to select based upon assigned priorities may be determined by dividing the number of ten (10) frames by the accelerated frame rate (2×), resulting in a selection subset specification of five (5) frames. As such, within the present example, only half of the I-Frames may be displayed for the accelerated frame rate of two times (2×) the standard frame rate. This result may be scaled across different accelerated frame rates, as appropriate for the given implementation.

It should be noted that the present technology is intended to be relatively independent of the accelerated frame-rate frame selection/skipping technology on a given content rendering device. As will be described in more detail below, the present technology replicates frame timeslot assignments to allow the present technology to operate irrespective of whether a particular rendering device begins with a first frame timeslot in a given sequence or skips the first frame timeslot to begin accelerated frame rate operations on, for example, a second frame timeslot during the (2×) accelerated frame rate. Similar analysis applies to other accelerated frame rate selections as described in more detail below. The present technology also may be implemented to control rendering times of individual frames based upon accelerated frame rate priorities. As such, the present technology may be flexibly implemented into newer rendering devices, while allowing operation of the present technology on in-service legacy devices, such as set-top-boxes (STBs).

Continuing with the present example, from Table (1), it can be seen that I-Frames two (2), four (4), and eight (8) satisfy a rendering threshold priority of fifty percent (e.g., 0.5), and that each of I-Frame seven (7) and I-Frame ten (10) have higher rendering threshold priorities of seventy-five percent and one hundred percent (e.g., 0.75 and 1.0), respectively. As such, I-Frames two (2), four (4), seven (7), eight (8), and ten (10) may be selected as a prioritized rendering subset of I-Frames and may be displayed at evenly distributed time intervals during the accelerated frame rate rendering (e.g., 2× frame rate in the current stage of the present example).

However, it should be noted from Table (1) that, to avoid a blank rendering frame time, timeslot one (1) associated with I-Frame one (1) may be selected as the first rendering time for the first selected prioritized frame (e.g., I-Frame two (2) within the present example). Similarly, timeslot three (3), timeslot five (5), timeslot seven (7), and timeslot nine (9), are selected for the respective rendering of the remaining selected prioritized I-Frames four (4), seven (7), eight (8), and ten (10). This selection and re-distribution and re-alignment of frames are represented within the following Table (2).

allow alternative frame skipping technologies to still result in selection of the appropriate prioritized frame. Similarly, prioritized I-Frame (4) is re-distributed and re-aligned in time from its original timeslot (4) to be rendered beginning in timeslot (3) and is replicated in timeslot (4) to also allow alternative frame skipping technologies to still result in selection of the appropriate prioritized frame. Prioritized I-Frame (7) is re-distributed and re-aligned in time from its original timeslot (7) beginning in timeslot (5) and is replicated in timeslot (6) to also accommodate alternative frame skipping technologies. Prioritized I-Frame (8) is re-distributed and re-aligned in time from its original timeslot (8) beginning in timeslot (7) and is replicated in timeslot (8) for similar reasons as described above. Prioritized I-Frame (10) is re-distributed and re-aligned in time from its original timeslot (10) beginning in timeslot (9) and is replicated in timeslot (10) again for similar reasons as described above. As such, the prioritized video frame subset may be re-distributed and re-aligned, and replicated, to maximize the probability of viewing of each prioritized I-Frame during the accelerated frame rate time period with relative independence from the underlying accelerated frame rate technology.

What this set of examples illustrate is that the present technology allows advertisers to specify priorities for individual I-Frames. This set of examples further illustrate that the present technology additionally facilitates time-shifting of frame rendering to allow rendering of specified and selected prioritized I-Frames during any selected I-Frame timeslot as appropriate for the given implementation. Each frame within the present example of Table (2) is displayed at an earlier frame time relative to the respective frame's normal original designated time within the I-Frame sequence shown within Table (1).

The present technology is designed in recognition that fast-forward operations are possible where the video frames are stored locally, either due to video content being previously recorded or paused, or due to the video content being stored on a video disk. Similarly, fast-rewind operations are possible at any point in time where the video frames are stored locally.

As such, at any point in time prior to a fast-forward selection or a fast-rewind selection by a user, the present technology may parse video content, such as that illustrated with reference to Table (1), may cache or buffer I-Frames that have designated priorities usable for I-Frame subset selection during a fast-forward or fast-rewind operations, and may cache or buffer the respective priorities with the

TABLE 2

Example I-Frame Re-Distribution and Re-Alignment for (2X) Acceleration

| | TIMESLOT | | | | | | | | | |
|---|---|---|---|---|---|---|---|---|---|---|
| | 1 | 2 | 3 | 4 | 5 | 6 | 7 | 8 | 9 | 10 |
| FRAME | 2 | 2 | 4 | 4 | 7 | 7 | 8 | 8 | 10 | 10 |
| PRIORITY | 0.5 | 0.5 | 0.5 | 0.5 | 0.75 | 0.75 | 0.5 | 0.5 | 1.0 | 1.0 |

As can be seen from Table (2), for a 2X accelerated frame rate selection, the determined quantity of prioritized individual video frames are re-distributed and re-aligned to maximize rendering of each selected prioritized video frame within the prioritized video frame subset. Within the present example, prioritized I-Frame (2) is re-distributed and re-aligned in time from its original timeslot (2) to be rendered beginning in timeslot (1) and is replicated in timeslot (2) to respective I-Frames. The I-Frames may be cached or buffered in a decoded or encoded form as appropriate for the given implementation.

Selection of I-Frame subsets may be performed responsive to real-time detection of fast-forward or fast-rewind operations, and the appropriate prioritized cached/buffered I-Frames may be rendered (including decoding as appropriate) within the designated scaled timeslots. As described above, the prioritized, scaled rendering timeslots may be completely different timeslots from the normal timeslots of the respective I-Frames within the original video advertising content. As such, the present technology provides flexibility and granularity with respect to I-Frame rendering during accelerated frame rate rendering.

As described above, and in more detail below, higher-priority frames may be rendered for longer periods of time. Within the context of the present example, I-Frame (7) and I-Frame (10) may be rendered for longer periods of time than the other lower-priority frames in the prioritized video frame subset. The determination of an initial rendering timeslot and duration may be performed as appropriate for the given implementation.

Within this context and continuing with the present example of Table (1), during an accelerated frame rate of three times (3×) the standard frame rate, only three frames may be displayed (3.333 frames is rounded down to 3). Two of the three frames may be rendered for three (3) timeslots each, and one of the three frames may be extended to be rendered across two accelerated frame rate timeslots). In this case, I-Frames seven (7) and ten (10) are selected first since they have the highest priorities of the available frames. Three frames exist with equal priority of fifty percent (0.5) (e.g., I-Frame (2), I-Frame (4), and I-Frame (8)), but only one may be selected for rendering in the video frame subset. In consideration of viewer factors, such as approximating equal display time of each frame and distribution of video content, an I-Frame with a priority of fifty percent that is evenly distributed relative to the other selected highest priority I-Frames may be chosen from the remaining available I-Frames.

Within the present example, it can be seen from Table (1) that I-Frame four (4) is evenly distributed within the original video advertising content relative to I-Frames seven (7) and ten (10). As such, I-Frame four (4) may be selected, though it should be noted that I-Frame two (2) or I-Frame (8) may alternatively be selected as appropriate for the given implementation. The present example results in a prioritized video frame subset of the individual prioritized video frames equal in number to the determined quantity (3) of individual prioritized video frames of the video advertisement of I-Frames four (4), seven (7), and ten (10).

Using the selection of I-Frames four (4), seven (7), and ten (10) for purposes of example, and again to avoid a blank rendering frame time, timeslot one (1) associated with I-Frame one (1) may be selected as the first rendering time for the first selected prioritized frame (e.g., I-Frame four (4) within the present example). Similarly, timeslot four (4) and timeslot seven (7) may be selected for the respective rendering of the remaining selected prioritized I-Frames seven (7) and ten (10). The following Table (3) represents this example re-distribution and re-alignment of rendering for the selected prioritized I-Frames four (4), seven (7), and ten (10).

TABLE 3

Example I-Frame Re-Distribution and Re-Alignment for (3X) Acceleration

| | TIMESLOT | | | | | | | | | |
|---|---|---|---|---|---|---|---|---|---|---|
| | 1 | 2 | 3 | 4 | 5 | 6 | 7 | 8 | 9 | 10 |
| FRAME | 4 | 4 | 4 | 7 | 7 | 7 | 10 | 10 | 10 | 10 |
| PRIORITY | 0.5 | 0.5 | 0.5 | 0.75 | 0.75 | 0.75 | 1.0 | 1.0 | 1.0 | 1.0 |

As such, I-Frame four (4) may be replicated within each of timeslots one (1), two (2), and three (3). I-Frame seven (7) may be replicated within each of timeslots four (4), five (5), and six (6). I-Frame ten (10) may be replicated within each of timeslots seven (7), eight (8), nine (9), and ten (10). As described above, with timeslot one (1) selected as the first rendering time, with a (3×) (e.g., skip two timeslot) accelerated frame rate, I-Frame (10) would be rendered during each of timeslot seven (7) and timeslot ten (10), resulting in I-Frame (10) being rendered for the longest duration as the highest-priority frame of the prioritized video frame subset. For alternative frame skipping starting timeslots, such as starting in timeslot two (2), each prioritized frame may still be rendered once during a (3×) (e.g., skip two timeslot) accelerated frame rate. As such, the present technology spans several architectural implementations of accelerated frame rate technologies to provide a flexible and effective advertising impact during accelerated frame rate operations, and allows the present technology to be implemented in a backwards compatible manner without requiring upgrade of in-service legacy rendering devices, such as STBs. However, it should additionally be noted that time/duration shifting may be implemented to adjust rendering times of different/individual prioritized frames on newer rendering devices to allow further granularity of control over time alignment and duration of rendering of individual prioritized frames as newer rendering devices are deployed into service.

As described above, I-Frame ten (10), which has the highest priority of all frames within the selection set (one hundred percent or 1.0) will be rendered for the longest time (two frame times) relative to the other two selected frames. As such, the present technology also differentiates between priorities within a video frame selection set to render higher priority frames for longer periods of available time, while still rendering all appropriate frames within the selection set for maximum available times to further improve advertising product/service promotion during the accelerated frame rate time period.

Continuing further with the present example of Table (1), during an accelerated frame rate of ten times (10×) the standard frame rate, only one frame may be displayed. With reference to Table (1), I-Frame ten (10) has the highest priority (e.g., 1.0) and may be selected and rendered throughout the entire advertising time period. As such, the I-Frame ten (10) may be replicated in each of timeslot one (1) through timeslot ten (10), which again may further improve advertising product/service promotion during the accelerated frame rate time period by ensuring that I-Frame ten (10) gets selected regardless of the underlying accelerated frame rate implementation.

Accordingly, the present example illustrates that the present technology allows advertisers to specify priorities for individual I-Frames. This example also illustrates that the present technology further facilitates time-shifting and duration shifting of frame rendering to allow rendering of specified and selected prioritized I-Frames during selected I-Frame timeslots and for multiple timeslots as appropriate for the given implementation.

Within the present example, each frame within the present example is displayed at an earlier frame time relative to the original/normal locations of the respective frames within the I-Frame sequence shown within Table (1). However, it should be noted that I-Frames may be displayed in timeslots later than the locations of the respective frames within a given I-Frame sequence, as appropriate for a given implementation.

It should further be noted that several options for encoding of the individual frame priorities are possible. For example, individual frame priorities may be encoded within unused bits of video packet headers.

Alternatively, individual frame priorities may be encoded within a separate file that is delivered in association with or otherwise accessible by the rendering device. Such a frame priority file may map each I-Frame of a video to a priority value. With this latter option of a separate frame priority file, existing videos (e.g., DVDs) may be associated with frame priorities without a need to create new disks.

Further, with either option of using unused video packet header bits or a separate frame priority file, newer decoders may utilize the encoded priorities without requiring a retrofit of the technology to older devices. Further, older devices that are not configured to process the frame priorities described herein may omit consideration of the frame priorities, whether encoded within unused bits of a video packet header or within a separate file.

An additional option for encoding of frame priorities may be to encode the frame priorities using separate video streams (e.g., using different program identifiers (PIDs)), where the separate video streams may be selected based upon the selected accelerated frame rate. Within this example encoding, I-Frames may be replicated/encoded into multiple timeslots and rendered multiple times to create the accelerated frame rates described above in association with Table (1).

As such, for the example of the accelerated frame rate (2×), which results as described above in the selection subset specification of five (5) frames (e.g., I-Frames two (2), four (4), seven (7), eight (8), and ten (10)), the respective I-Frames may each be replicated/encoded twice beginning with the specified timeslots. For this example, and again to avoid a blank rendering frame time, each of timeslot one (1) and the timeslot two (2) may be encoded with the selected prioritized I-Frame two (2). Similarly, timeslot three (3) and timeslot four (4) may be encoded with I-Frame four (4). Timeslot five (5) and timeslot six (6) may be encoded with I-Frame seven (7). Similarly, timeslot seven (7) and timeslot eight (8) may be encoded with I-Frame eight (8), while timeslot nine (9) and timeslot ten (10) may be encoded with I-Frame ten (10). Similar encodings may be performed for different accelerated frame rates consistent with the examples above, and as appropriate for the given implementation.

As such, a video stream for a standard playback rate may be streamed with other video streams that are encoded with repeated prioritized I-Frames for accelerated frame rates or accelerated frame rate ranges. A program association table (PAT) or other stream identification delivery mechanism may be utilized to identify the different PIDs associated with the different streams. The decoding device may utilize the PIDs associated with the different streams to select the different streams for different playback rates.

Where accelerated frame rate ranges are utilized, the ranges may further be specified to be mutually exclusive (e.g., 2×-3× acceleration, 4×-5× acceleration, etc.). With use of separate streams, video I-Frames may be replicated within sequential I-Frame slots to encode the respective frame priorities.

Further, use of different video streams may also allow encoding of video content that is different in form from the normal advertising content (e.g., special "splash" screens may be encoded and repeated across multiple I-Frame timeslots). As such, an advertiser may encode one or more splash screens that were not present in the original video advertisement, but that for example, capture the content of multiple aspects of the original advertisement. Accordingly, in addition to improving advertising impact based upon the available individual frames of an advertisement, the present technology may further provide an opportunity to change the content of each key frame to any content, which may further improve advertising product/service promotion during the accelerated frame rate time period.

The different rate video streams may be streamed from a service provider to viewer devices in several different streams or several different streams may be stored on a video disk. When a viewer selection of an accelerated frame rate (e.g., fast-forward or fast-rewind) is detected, the alternative program stream may be selected and rendered with the frame replication encoded in advance.

It should be noted that several other possible options for encoding of individual frame priorities may be implemented based upon the description herein. As such, all such frame priority encoding options are considered within the scope of the present technology.

The term "video content" and "video" as the terms are used herein refer to video content with audio content (e.g., audio/video content) or video content without audio content, as appropriate for the given implementation. Further, video and audio/video content may be received, such as by a set-top-box (STB), as part of a stream and may be stored (e.g., recorded, paused, etc.) for viewing. Alternatively, video and audio/video content may be stored on a video disk, such as a digital video disk (DVD), Blu-Ray® disk, or other form of storage device.

It is understood that several different audio/video encoding standards and different video compression standards exist, such as the set of Moving Pictures Expert Group (MPEG) video standards. Many other audio/video encoding standards and video compression standards exist or may be developed over time. As such, the description herein is presented generally to have applicability for any currently-existing or future audio/video standard. It is further understood that digital video content may be encoded into packetized elementary streams (PESs). As such, program streams generally refer to digital program-level audio/video stream encoding. Further, packetized elementary streams may be combined into program or transport streams, such as lossless platforms including digital video disk (DVD) (e.g., error correction may or may not be implemented) and lossy platforms including satellite transport systems (e.g., with error correction implemented). Within certain encoding standards, program and transport streams may encode multiple programs. Program-specific information (PSI) may form a portion of a stream, and the programs may be distinguished within the respective streams using program identifiers (PIDs). The PIDs for the different programs may be identified within program map tables (PMTs) that are identified within program association tables (PATs) that each forms a portion of the respective streams. The present description leverages this understanding, but does not attempt to teach every facet of video encoding to maintain a broad applicability to any present or future encoding technique or standard.

The present technology may further be applied to any audio/video encoding format, including both compressed and uncompressed formats, where individual frames of video content may be identified and selected for rendering as described herein. It is understood that, while different encoding technologies exist for audio/video content, an "intracoded" frame (I-Frame or IFrame) generally refers to a video frame with complete internal coding (all information usable to render the entire frame), such that the video frame may be decoded to represent an entire display screen image without requiring information for a previous or subsequent frame. It is also understood that other frames may exist within a video frame sequence that are not I-Frames. These other intermediate frames may be referred to as predictive frames (P-Frames or PFrames) or bi-predictive frames (B-Frames or BFrames). Depending upon the given encoding standard, P-Frames generally refer to frames that encode only the changes from a previous frame, such that background still image information is not provided in the P-Frame, which allows further compression of the video content. B-Frames may be encoded with only the differences from both previous and following frames.

With this understanding, P-Frames and B-Frames require information from other frames to be decoded to render a complete video image. As such, the description herein utilizes prioritization and alignment of I-Frames for purposes of description because each I-Frame may be decoded in its entirety separately from other frames to render a complete visual image on a display screen. However, it is understood that P-Frames and B-Frames, or other forms of video frames, may alternatively and/or additionally be prioritized and aligned, with the understanding that additional decoding would be performed for other previous and/or following frames to render a full screen image to provide the desired advertising impact.

It is further understood that one or more I-Frames may be encoded into a given digital video packet within a PES, as appropriate for the particular video standard. As such, the present technology applies to any form of packetizing video frames.

It should be noted that conception of the present subject matter resulted from recognition of certain limitations associated with previous advertisement technology used during accelerated frame rates. For example, it was observed that prior technologies of accelerated frame rate operations perform "frame skipping" or similar operations to render individual frames, such as I-Frames, during a fast-forward or fast-rewind operation. For example, it was observed that frame skipping during a multiple of normal playback rate (e.g., 2× playback rate) for fast-forward or fast-rewind results in a periodic selection and display of certain I-Frames, with all other I-Frames and other intermediate frames (P-Frames, B-Frames, etc.) being skipped, and that only the periodically selected I-Frames are rendered. However, it was also observed that the previous frame skipping technology resulted in a sequence of I-Frames being rendered that do not have any correlation with the actual advertising content. It was determined from these several observations that the previous accelerated frame rate technologies do not allow advertisers to specify which frames are rendered during the periodic time-aligned I-Frame slots. It was further determined that technology that allows advertisers to specify which I-Frames are rendered during particular periodic timeslots during accelerated frame rate operations may improve advertising product/service promotion during the accelerated frame rate time period. It was further determined that that technology that allows advertisers to specify different priorities for different accelerated frame rate options would further improve advertising product/service promotion during the accelerated frame rate time period at different accelerated frame rates. The present subject matter improves advertising impact during accelerated frame rate operations by providing for accelerated frame rate advertising-prioritized video frame alignment, as described above and in more detail below. As such, improved advertising impact during accelerated frame rate operations may be obtained through use of the present technology.

The accelerated frame rate advertising-prioritized video frame alignment described herein may be performed in real time to allow prompt selection of prioritized video frames for rendering and redistribution and alignment of the selected prioritized video frames during an accelerated frame rate time period. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for accelerated frame rate advertising-prioritized video frame alignment. A computing device_1 102 through a computing device_N 104 communicate via a network 106 with several other devices. The other devices include a content server_1 108 through a content server_M 110. A content database 112 represents one or more physical storage locations for audio/video content that may be distributed by the respective content server_1 108 through the content server_M 110.

As will be described in more detail below in association with FIG. 2 through FIG. 4B, the computing device_1 102 through the computing device_N 104 and the content server_1 108 through the content server_M 110 may each provide automated accelerated frame rate advertising-prioritized video frame alignment. The automated accelerated frame rate advertising-prioritized video frame alignment is based upon detection of user fast-forward and fast-reverse selections associated with advertising content, and frame re-alignment/rendering based upon assigned frame priorities and available frame timeslots relative to a selected accelerated frame rate. As such, the present technology may be implemented at a user computing device or server device level. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, tablet computing device, e-book reading device, etc.), a web server, an application server, or other data server device, or any other device capable of processing information as described above and in more detail below. Additionally, the content server_1 108 through the content server_M 110 represent any content distribution server, such as a "head end" content distribution server or intermediate distribution server of a cable or satellite network, a streaming video content server, or other server as appropriate for the given implementation. Additionally, the computing device_1 102 through the computing device_N 104 represent any content storage and/or viewing device capable of rendering video content, such as a set-top-box (STB), a home video disk server, a computer/laptop, a handheld tablet or smartphone, or other content rendering device as appropriate for the given implementation.

The network 106 may include any content access/distribution network, such as a cable or satellite network, or other form of interconnection suitable for the intended purpose, including a private or public network such as an intranet or the Internet, respectively, direct inter-module interconnection, dial-up, wireless, or any other interconnection mechanism capable of interconnecting the respective devices.

The content database 112 may include a relational database, an object database, or any other storage type of device. As such, the content database 112 may be implemented as appropriate for a given implementation.

Figure 2:
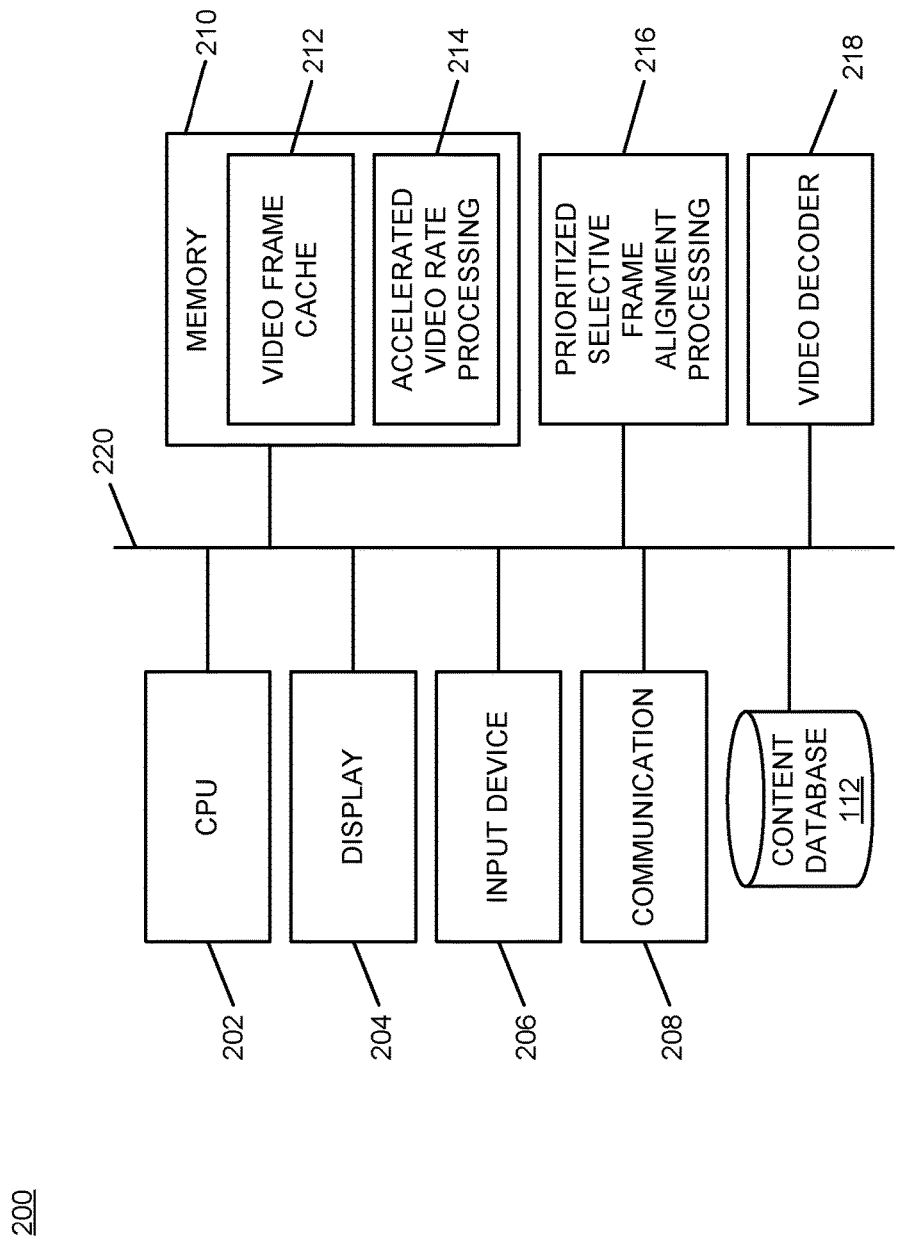
FIG. 2 is a block diagram of an example of an implementation of a core processing module capable of performing accelerated frame rate advertising-prioritized video frame alignment according to an embodiment of the present subject matter.

FIG. 2 is a block diagram of an example of an implementation of a core processing module 200 capable of performing accelerated frame rate advertising-prioritized video frame alignment. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of accelerated frame rate advertising-prioritized video frame alignment in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback to perform the accelerated frame rate advertising-prioritized video frame alignment. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a video frame cache storage area 212 that stores video frames (e.g., I-Frames or other frames) within the core processing module 200. The video frames may be stored within a cache or buffer type data structure, or otherwise as appropriate for a given implementation.

An accelerated video rate processing storage area 214 within the memory 210 provides execution and storage space for calculations related to frame priorities, including frame priority association with parsed video frames, frame timeslot alignment information, and other information, as described herein. It is understood that the information stored within the accelerated video rate processing storage area 214 may be created in real time responsive to detection of an accelerated frame rate, or data structures (e.g., tables, etc.) of frame priority and frame alignment information may be constructed as video content is parsed in advance of detection of an accelerated frame rate, as appropriate for the given implementation.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A prioritized selective frame alignment processing module 216 is also illustrated. The prioritized selective frame alignment processing module 216 provides accelerated frame rate detection, frame priority analysis, and frame alignment processing for the core processing module 200, as described above and in more detail below. The prioritized selective frame alignment processing module 216 implements the automated accelerated frame rate advertising-prioritized video frame alignment of the core processing module 200.

It should also be noted that the prioritized selective frame alignment processing module 216 may form a portion of other circuitry described without departure from the scope of the present subject matter. Further, the prioritized selective frame alignment processing module 216 may alternatively be implemented as an application stored within the memory 210. In such an implementation, the prioritized selective frame alignment processing module 216 may include instructions executed by the CPU 202 for performing the functionality described herein. The CPU 202 may execute these instructions to provide the processing capabilities described above and in more detail below for the core processing module 200. The prioritized selective frame alignment processing module 216 may form a portion of an interrupt service routine (ISR), a portion of an operating system, a portion of a browser application, or a portion of a separate application without departure from the scope of the present subject matter.

A video decoder 218 is also illustrated and provides video decoding to decode individual video frames or streamed video content. The video decoder 218 may be implemented as appropriate for a given implementation to comply with any appropriate video encoding/decoding standard. The video decoder 218 may be accessed and controlled by the prioritized selective frame alignment processing module 216 to perform real-time decoding of prioritized frames in response to detected selections of accelerated frame rates associated with rendering an advertisement, and to create alternative advertising streams for different accelerated frame rate selection options.

The content database 112 is again shown within FIG. 2 associated with the core processing module 200. As such, the content database 112 may be operatively coupled to the core processing module 200 without use of network connectivity, as appropriate for a given implementation.

The CPU 202, the display 204, the input device 206, the communication module 208, the memory 210, the prioritized selective frame alignment processing module 216, the video decoder 218, and the content database 112 are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the content database 112 is illustrated as a separate component for purposes of example, the information stored within the content database 112 may also/alternatively be stored within the memory 210 without departure from the scope of the present subject matter.

Accordingly, the core processing module 200 may take many forms and may be associated with many platforms.

Figure 3:
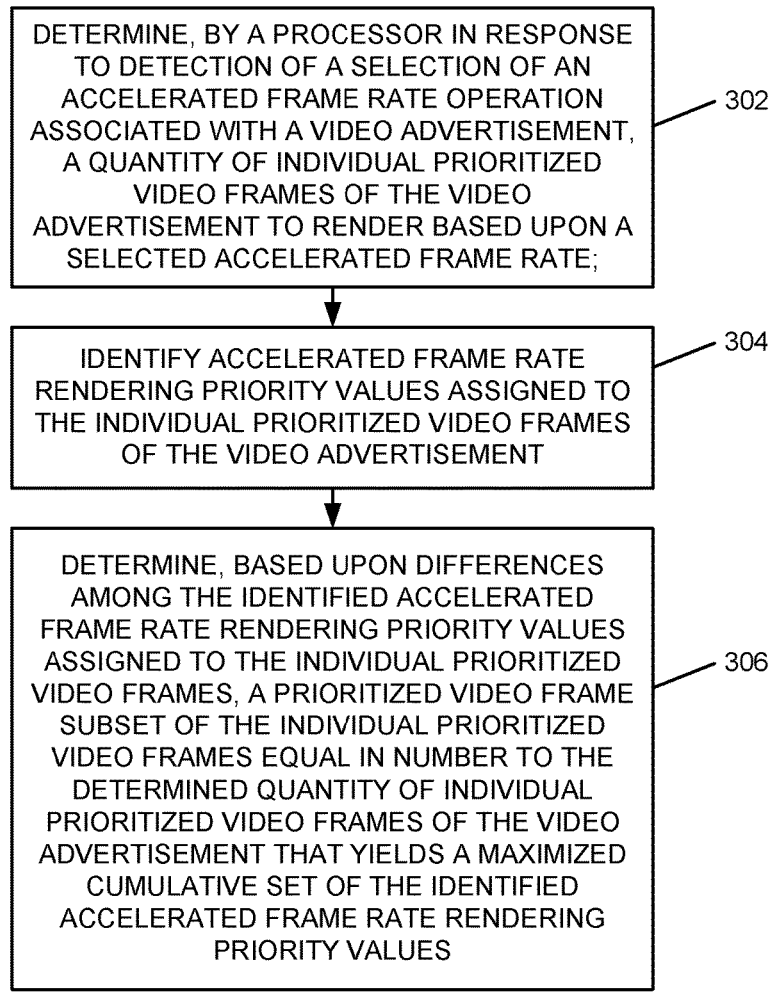
FIG. 3 is a flow chart of an example of an implementation of a process for accelerated frame rate advertising-prioritized video frame alignment according to an embodiment of the present subject matter.
Figure 4A:
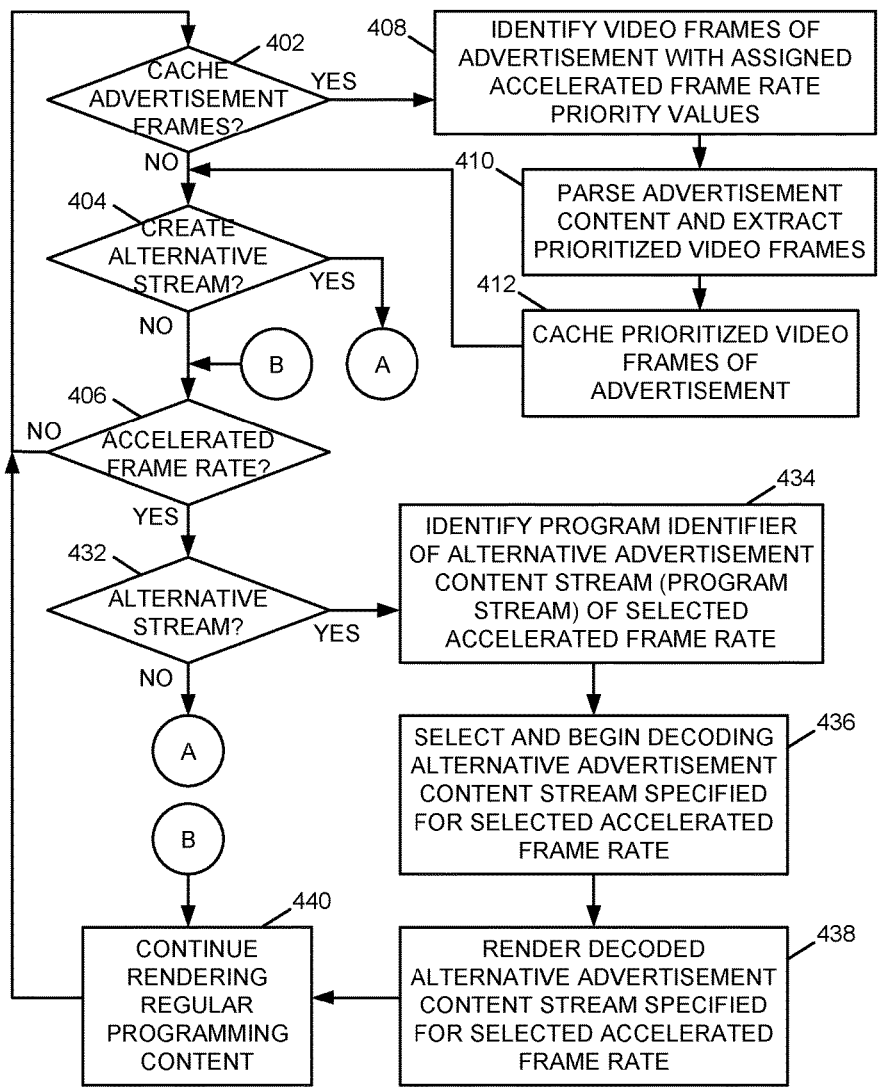
FIG. 4A is a flow chart of an example of an implementation of initial processing within a process for accelerated frame rate advertising-prioritized video frame alignment with caching of prioritized video frames and creation/use of alternative advertisement content streams according to an embodiment of the present subject matter.
Figure 4B:
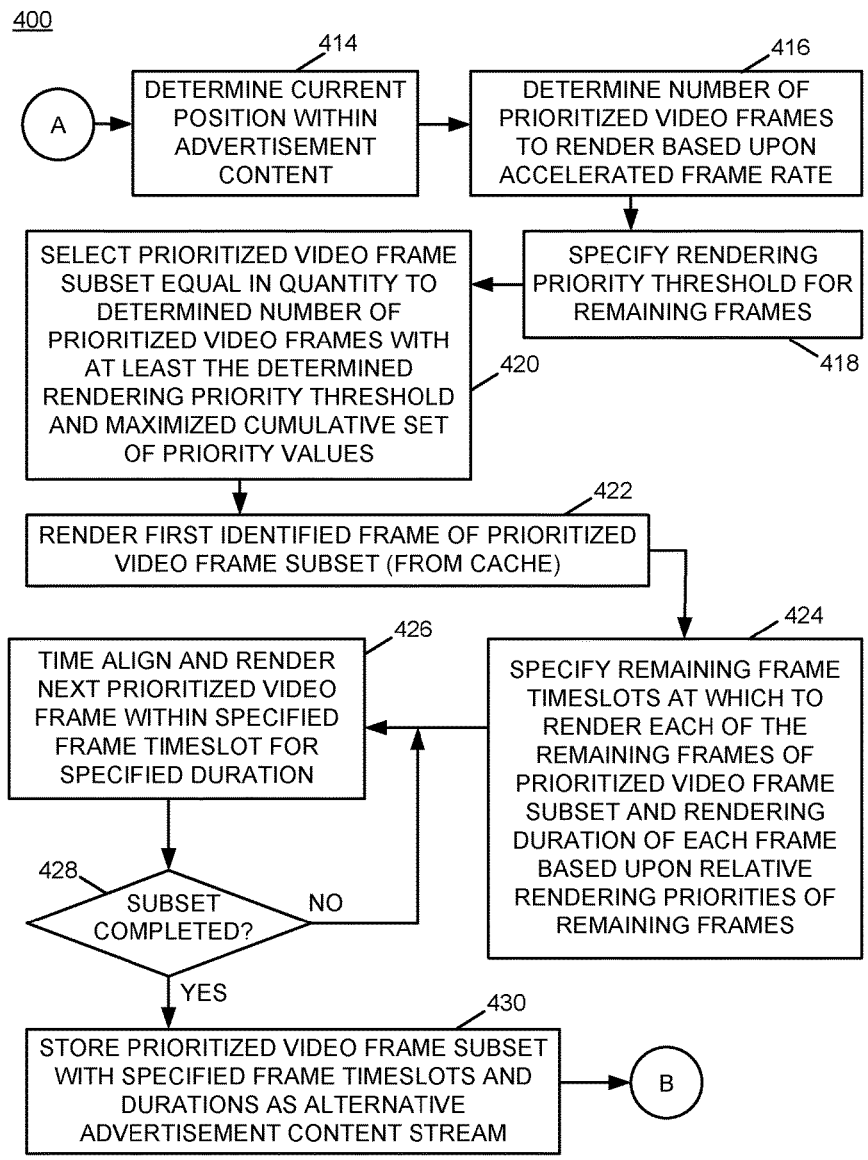
FIG. 4B is a flow chart of an example of an implementation of additional processing within a process for accelerated frame rate advertising-prioritized video frame alignment with caching of prioritized video frames and creation/use of alternative advertisement content streams according to an embodiment of the present subject matter.

FIG. 3 through FIG. 4B described below represent example processes that may be executed by devices, such as the core processing module 200, to perform the automated accelerated frame rate advertising-prioritized video frame alignment associated with the present subject matter. Many other variations on the example processes are possible and all are considered within the scope of the present subject matter. The example processes may be performed by modules, such as the prioritized selective frame alignment processing module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for accelerated frame rate advertising-prioritized video frame alignment. At block 302, the process 300 determines, by a processor in response to detection of a selection of an accelerated frame rate operation associated with a video advertisement, a quantity of individual prioritized video frames of the video advertisement to render based upon a selected accelerated frame rate. At block 304, the process 300 identifies accelerated frame rate rendering priority values assigned to the individual prioritized video frames of the video advertisement. At block 306, the process 300 determines, based upon differences among the identified accelerated frame rate rendering priority values assigned to the individual prioritized video frames, a prioritized video frame subset of the individual prioritized video frames equal in number to the determined quantity of individual prioritized video frames of the video advertisement that yields a maximized cumulative set of the identified accelerated frame rate rendering priority values.

FIGS. 4A-4B illustrate a flow chart of an example of an implementation of a process 400 for accelerated frame rate advertising-prioritized video frame alignment with caching of prioritized video frames and creation/use of alternative advertisement content streams. FIG. 4A illustrates initial processing within the process 400. At decision point 402, the process 400 begins higher-level iterative processing. The higher-level iterative processing will be described before processing associated with the respective decision points. At decision point 402, the process 400 makes a determination as to whether to cache advertisement video frames. It should be noted that caching of video frames of an advertisement may be performed in association with creation of alternative advertising content streams or in association with real-time rendering of video frames stored within the cache. Processing associated with an affirmative decision at this decision point will be deferred and described in detail below in favor of further description of the higher-level iterative processing of the process 400.

In response to determining at decision point 402 not to cache advertisement video frames, the process 400 makes a determination at decision point 404 as to whether to create an alternative advertising content stream for use during accelerated frame rate playback. Again, processing associated with an affirmative decision at this decision point will be deferred and described in detail below in favor of further description of the higher-level iterative processing of the process 400.

As such, in response to determining at decision point 404 not to create an alternative advertising content stream for use during accelerated frame rate playback, the process 400 makes a determination at decision point 406 as to whether an accelerated frame rate selection has been detected in association with rendering video content of an advertisement. The accelerated frame rate selection may include a fast-forward or a fast-rewind selection, and may include multiple tiers of accelerated frame rates (e.g., 2×, 3×, etc.) as appropriate for the given implementation. Again, processing associated with an affirmative decision at this decision point will be deferred and described in detail below in favor of further description of the higher-level iterative processing of the process 400. In response to determining that an accelerated frame rate selection is not been detected, the process 400 returns to decision point 402 and iterates at a high level as described above.

Returning to the description of decision point 402, in response to determining to cache advertisement video frames, the process 400 identifies video frames of the advertisement with assigned accelerated frame rate priority values at block 408. Identification of video frames of the advertisement with assigned accelerated frame rate priority values may be performed during parsing of the advertisement content on a frame-by-frame basis or may be read from a separate file, as appropriate for the given implementation. Where the identification of prioritized video frames is performed during parsing of the advertisement content, priority values for individual video frames may be identified within bits of a packetized elementary stream (PES) packet header that are unused by the respective video formatting standard. Many other options for identification of video frames with assigned accelerated frame rate priority values and the respective assigned accelerated frame rate priority values are possible, and all such options are considered within the scope of the present subject matter.

It should be noted that the frames with assigned accelerated frame rate priority values may be intracoded frames (e.g., I-Frames) to aid with and expedite decoding. As described above, I-Frames are fully encoded with all the information needed to render the entire frame and do not rely upon other frames for information/video content. Alternatively, non-intracoded frames (e.g., B-Frames and P-Frames) may be encoded with priority values as appropriate for a given implementation. It should further be noted that where alternative non-intracoded frames are assigned priority values and cached, the associated I-Frames from which the content of the respective alternative non-intracoded frames may be decoded may also be cached to allow decoding of these other types of frames at a later time.

At block 410, the process 400 parses the advertisement content and extracts the prioritized video frames. At block 412, the process 400 caches the extracted prioritized video frames of the advertisement within a memory, such as the video frame cash 212 within the memory 210.

The process 400 transitions again to the processing associated with decision point 404. Returning to the description of decision point 404, in response to determining to create an alternative advertising content stream for use during accelerated frame rate playback, the process 400 transitions to the processing shown and described in association with FIG. 4B.

FIG. 4B illustrates additional processing associated with the process 400 for accelerated frame rate advertising-prioritized video frame alignment with caching of prioritized video frames and creation/use of alternative advertisement content streams. It should be noted that the processing associated with FIG. 4B is described in association with both creation of alternative advertising content streams and real-time rendering of video frames from a cache responsive to a detected selection of an accelerated frame rate associated with an advertisement for compactness of description because the processing for each situation is similar in form. Certain distinctions in processing between the two aspects of the process 400 are described in detail below with the understanding that alternative actions may be appropriate for use of the described processing for either variation of processing and that all such alternative actions are considered within the scope of the present subject matter. It should further be noted that the processing described in association with FIG. 4B may alternatively be implemented as a stand-alone process for creation of alternative video streams for different accelerated frame rates.

At block 414, the process 400 determines a current position within the advertisement content. The current position within the advertisement content may be at the beginning of the advertisement itself during creation of an alternative advertisement content stream. Alternatively, where the processing occurs responsive to detected selections of an accelerated frame rate, the current position may be at the beginning of the advertisement or at some other location associated with the user selection of an accelerated frame rate option.

At block 416, the process 400 determines a number of prioritized video frames to render based upon a particular accelerated frame rate. Again, during creation of an alternative advertisement content stream, the accelerated frame rate to be associated with the alternative advertisement content stream may be specified for use during the entire created alternative advertisement content stream. Alternatively, responsive to additional user selections of accelerated frame rates, the respective selected accelerated frame rate may change in response to each detected user selection, in which case both the accelerated frame rate and the current position within the advertisement content may be different responsive to each selection of accelerated frame rate.

At block 418, the process 400 specifies a rendering priority threshold for the remaining frames of the advertisement content. As described above, specific rendering priority thresholds may be configured by advertisers using the assigned accelerated frame rate priority values. As such, the rendering priority threshold may specify a minimum assigned accelerated frame rate priority value for inclusion of frames within a prioritized video frame subset.

At block 420, the process 400 selects a prioritized video frame subset equal in quantity to the determined number of prioritized video frames with at least the determined rendering priority threshold and a maximized cumulative set of priority values. The prioritized video frames may be selected from the cache storage. It should be noted that the maximized cumulative set of priority values may be determined where more than the determined number of prioritized video frames satisfy the specified rendering priority threshold. In this case, a subset of the video frames that satisfy the rendering priority threshold may be selected to maximize the cumulative set of priority values within the prioritized video frames subset. Further, where more than one subset of video frames that satisfy the specified rendering priority threshold result in equal cumulative subsets of priority values, either subset may be selected as the prioritized video frame subset as appropriate for a given implementation.

At block 422, the process 400 renders the first identified frame of the prioritized video frame subset, such as from the cache memory. Prompt rendering of the first identified frame within the prioritized video frame subset may be utilized to avoid blank images either within an alternative advertisement content stream or during real-time rendering. Subsequent frames may be time aligned based upon human factors such as viewing periodicity of sequential frames and frame rendering times associated with different accelerated frame rates.

At block 424, the process 400 specifies the remaining frame timeslots at which to render each of the remaining frames of the prioritized video frame subset and specifies a rendering duration (e.g., number of timeslots and/or time/duration shifting) of each frame based upon the relative rendering priorities of the frames of the prioritized video frame subset, including the priority of the first rendered frame. As described above, higher priority frames may be rendered for longer durations than lower priority frames to improve the advertising impact of the higher priority frames by increasing the number of replications of the higher priority frames or actual rendering durations to allow extended rendering of the respective frames under varying accelerated frame rates/technologies. As such, the process 400 specifies an individual rendering duration of each prioritized video frame of the prioritized video frame subset. The specified individual rendering duration of each prioritized video frame of the prioritized video frame subset may be based upon differences among the assigned accelerated frame rate rendering priority values of the individual prioritized video frames of the prioritized video frame subset. As with the example described above in association with Table (1), one or more higher-prioritized video frames of the prioritized video frame subset may be rendered for a longer duration than at least one lower-prioritized video frame of the prioritized video frame subset to enhance the advertising impact of the respective prioritized frames. Many other possibilities for varying prioritized video frame rendering timeslots and rendering durations of prioritized video frames to improve advertising impact during accelerated frame rate rendering of video frames are possible, and all such possibilities are considered within the scope of the present subject matter.

At block 426, the process 400 time aligns and renders the next prioritized video frame within the specified frame timeslot for the specified duration. Again, this processing may be used to create an alternative advertising content stream or may be used during real-time rendering of prioritized video frames responsive to detected selections of accelerated frame rate during an advertisement.

At decision point 428, the process 400 makes a determination as to whether rendering of the prioritized video frame subset has been completed. In response to determining that rendering of the prioritized video frame subset has not been completed, the process 400 returns to block 426 to time align and render the next prioritized video frame within the specified frame timeslot for the specified duration assigned to that frame.

As such, the process 400 sequentially renders the prioritized video frames of the prioritized video frame subset during the respective specified distributed video frame rendering timeslots of the accelerated frame rate rendering associated with a video advertisement. It should be noted that, as with the example described above in association with Table (1), one or more prioritized video frames may be rendered during a different distributed accelerated video frame rendering timeslot than a normal-playback video frame rendering timeslot of the respective prioritized video frame. This realignment of video frames based upon the respective assigned accelerated frame rate priority values may be used to further enhance advertising impact of the respective prioritized frames and may be used to ensure that the higher-priority video frames are rendered, for example, with a more-regimented cadence or periodicity than lower-priority video frames.

In response to determining at decision point 428 that rendering of the prioritized video frame subset has been completed, process 400 stores the prioritized video frame subset with the specified frame timeslots and rendering durations as an alternative advertisement content stream at block 430. It should be noted that storing and creating the alternative advertisement content stream may be considered optional for real time responses to detected selections of accelerated frame rates. In response to creating the alternative advertisement content stream, the process 400 transitions back to the processing described in association with FIG. 4A at decision point 406. It should be noted that the processing described in association with FIG. 4B is reused in another location of FIG. 4A described below. As such, processing for return from FIG. 4B to FIG. 4A will be to the location described below.

Returning to the description of decision point 406, in response to determining that an accelerated frame rate selection has been detected in association with rendering video content of an advertisement, the process 400 makes a determination at decision point 432 as to whether to tune into an alternative advertisement content stream to render the prioritized video frame subset. In response to determining not to tune an alternative advertisement content stream to render a prioritized video frame subset associated with the selected accelerated frame rate, the process 400 returns to the processing described above in association with FIG. 4B to perform real-time prioritized frame rate subset selection and rendering.

Alternatively, in response to determining at decision point 432 to tune into an alternative advertisement content stream, the process 400 identifies a program identifier (PID) of the alternative advertisement content stream associated with the selected accelerated frame rate at block 434. As described above, the process 400 may utilize program association tables and program map tables to identify the PIDs of the alternative advertisement content stream.

At block 436, the process 400 selects and begins decoding the alternative advertisement content stream specified for the selected accelerated frame rate. At block 438 the process 400 renders the decoded alternative advertisement content stream specified for the selected accelerated frame rate.

At block 440, in response to either rendering the decoded alternative program advertisement content stream at block 438, or in response to performing real-time prioritized video frame subset selection and rendering as described above in association with FIG. 4B, the process 400 continues rendering regular (non-advertisement) program content. It should be noted that rendering regular program content may be omitted where the process 400 is used to create alternative content streams rather than performing real-time rendering of prioritized video frame subsets during program rendering. The process 400 returns to decision point 402 to await a new determination to cache advertisement video frames.

As such, the process 400 provides processing to create alternative advertising content streams associated with different accelerated frame rate selection possibilities. The process 400 further provides processing for real time prioritized video frame subset selection and rendering options based upon individual assigned priorities associated with prioritized video frames of an advertisement.

As described above in association with FIG. 1 through FIG. 4B, the example systems and processes provide accelerated frame rate advertising-prioritized video frame alignment. Many other variations and additional activities associated with accelerated frame rate advertising-prioritized video frame alignment are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
by a processor in response to detection of a selection of an accelerated frame rate during decoding of video content:
identifying encoded accelerated frame rate decoding priority data values assigned to and usable to select which individual prioritized video frames of the video content to decode during the accelerated frame rate; and
determining, based upon differences among the assigned encoded accelerated frame rate decoding priority data values and the selected accelerated frame rate, a prioritized video frame subset of the individual prioritized video frames of the video content to decode that yields a maximized cumulative set of the assigned encoded accelerated frame rate decoding priority data values.

2. The method of claim 1, further comprising the processor:
specifying distributed video frame rendering timeslots at which to render each individual prioritized video frame of the prioritized video frame subset using the respective assigned encoded accelerated frame rate decoding priority data values of the individual prioritized video frames of the prioritized video frame subset and the selected accelerated frame rate; and
decoding and rendering the individual prioritized video frames of the prioritized video frame subset during the respective specified distributed video frame rendering timeslots during the accelerated frame rate, where at least one individual prioritized video frame is rendered during a different distributed video frame rendering timeslot than a normal-playback video frame rendering timeslot of the at least one individual prioritized video frame during a normal-playback frame rate of the video content.

3. The method of claim 1, further comprising the processor specifying an individual rendering duration of each individual prioritized video frame of the prioritized video frame subset based upon differences between the assigned encoded accelerated frame rate decoding priority data values of the individual prioritized video frames of the prioritized video frame subset, where at least one higher-priority value individual prioritized video frame of the prioritized video frame subset is specified to be rendered for a longer duration than at least one lower-priority value individual prioritized video frame of the prioritized video frame subset.

4. The method of claim 1, where different alternative video streams associated with the video content each encode a different prioritized video frame subset of individual prioritized video frames of the video content according to a different accelerated frame rate, and further comprising the processor:
selecting one of the alternative video streams that comprises the determined prioritized video frame subset; and
decoding the selected one of the alternative video streams that comprises the prioritized video frame subset of the individual prioritized video frames.

5. The method of claim 1, where the processor identifying the assigned encoded accelerated frame rate decoding priority data values of the individual prioritized video frames of the video content comprises the processor identifying the assigned encoded accelerated frame rate decoding priority data values within one of:
a digital elementary packetized stream of the video content that comprises the individual prioritized video frames; or
a separate video frame priority encoding file associated with the video content.

6. The method of claim 1, where the processor determining, based upon the differences among the assigned encoded accelerated frame rate decoding priority data values and the selected accelerated frame rate, the prioritized video frame subset of the individual prioritized video frames of the video content to decode that yields the maximized cumulative set of the assigned encoded accelerated frame rate decoding priority data values comprises the processor:
specifying, as a frame decoding metric, a rendering priority threshold value based upon the selected accelerated frame rate; and
selecting the prioritized video frame subset as a collection of the individual prioritized video frames with assigned encoded accelerated frame rate decoding priority data values at least equal to the specified rendering priority threshold value that yields the maximized cumulative set of the assigned encoded accelerated frame rate decoding priority data values.

7. The method of claim 1, where different subsets of intracoded frames (I-Frames) of the video content are specified for decoding at different accelerated frame rates according to differences among the encoded accelerated frame rate decoding priority data values.

8. A system, comprising:
an input device; and
a processor programmed to, in response to detection of a selection via the input device of an accelerated frame rate during decoding of video content:
identify encoded accelerated frame rate decoding priority data values assigned to and usable to select which individual prioritized video frames of the video content to decode during the accelerated frame rate; and
determine, based upon differences among the assigned encoded accelerated frame rate decoding priority data values and the selected accelerated frame rate, a prioritized video frame subset of the individual prioritized video frames of the video content to decode that yields a maximized cumulative set of the assigned encoded accelerated frame rate decoding priority data values.

9. The system of claim 8, where the processor is further programmed to:
specify distributed video frame rendering timeslots at which to render each individual prioritized video frame of the prioritized video frame subset using the respective assigned encoded accelerated frame rate decoding priority data values of the individual prioritized video frames of the prioritized video frame subset and the selected accelerated frame rate; and
decode and render the individual prioritized video frames of the prioritized video frame subset during the respective specified distributed video frame rendering timeslots during the accelerated frame rate, where at least one individual prioritized video frame is rendered during a different distributed video frame rendering timeslot than a normal-playback video frame rendering timeslot of the at least one individual prioritized video frame during a normal-playback frame rate of the video content.

10. The system of claim 8, where the processor is further programmed to specify an individual rendering duration of each individual prioritized video frame of the prioritized video frame subset based upon differences between the assigned encoded accelerated frame rate decoding priority data values of the individual prioritized video frames of the prioritized video frame subset, where at least one higher-priority value individual prioritized video frame of the prioritized video frame subset is specified to be rendered for a longer duration than at least one lower-priority value individual prioritized video frame of the prioritized video frame subset.

11. The system of claim 8, where different alternative video streams associated with the video content each encode a different prioritized video frame subset of individual prioritized video frames of the video content according to a different accelerated frame rate, and the processor is further programmed to:
select one of the alternative video streams that comprises the determined prioritized video frame subset; and
decode the selected one of the alternative video streams that comprises the prioritized video frame subset of the individual prioritized video frames.

12. The system of claim 8, where, in being programmed to identify the assigned encoded accelerated frame rate decoding priority data values of the individual prioritized video frames of the video content, the processor is programmed to identify the assigned encoded accelerated frame rate decoding priority data values within one of:
a digital elementary packetized stream of the video content that comprises the individual prioritized video frames; or
a separate video frame priority encoding file associated with the video content.

13. The system of claim 8, where, in being programmed to determine, based upon the differences among the assigned encoded accelerated frame rate decoding priority data values and the selected accelerated frame rate, the prioritized video frame subset of the individual prioritized video frames of the video content to decode that yields the maximized cumulative set of the assigned encoded accelerated frame rate decoding priority data values, the processor is programmed to:
specify, as a frame decoding metric, a rendering priority threshold value based upon the selected accelerated frame rate; and
select the prioritized video frame subset as a collection of the individual prioritized video frames with assigned encoded accelerated frame rate decoding priority data values at least equal to the specified rendering priority threshold value that yields the maximized cumulative set of the assigned encoded accelerated frame rate decoding priority data values.

14. A computer program product, comprising:
a computer readable storage medium having computer readable program code embodied therewith, where the computer readable program code when executed on a computer causes the computer to, in response to detection of a selection of an accelerated frame rate during decoding of video content:
identify encoded accelerated frame rate decoding priority data values assigned to and usable to select which individual prioritized video frames of the video content to decode during the accelerated frame rate; and
determine, based upon differences among the assigned encoded accelerated frame rate decoding priority data values and the selected accelerated frame rate, a prioritized video frame subset of the individual prioritized video frames of the video content to decode that yields a maximized cumulative set of the assigned encoded accelerated frame rate decoding priority data values.

15. The computer program product of claim 14, where the computer readable program code when executed on the computer further causes the computer to:
specify distributed video frame rendering timeslots at which to render each individual prioritized video frame of the prioritized video frame subset using the respective assigned encoded accelerated frame rate decoding priority data values of the individual prioritized video frames of the prioritized video frame subset and the selected accelerated frame rate; and
decode and render the individual prioritized video frames of the prioritized video frame subset during the respective specified distributed video frame rendering timeslots during the accelerated frame rate, where at least one individual prioritized video frame is rendered during a different distributed video frame rendering timeslot than a normal-playback video frame rendering timeslot of the at least one individual prioritized video frame during a normal-playback frame rate of the video content.

16. The computer program product of claim 14, where the computer readable program code when executed on the computer further causes the computer to specify an individual rendering duration of each individual prioritized video frame of the prioritized video frame subset based upon differences between the assigned encoded accelerated frame rate decoding priority data values of the individual prioritized video frames of the prioritized video frame subset, where at least one higher-priority value individual prioritized video frame of the prioritized video frame subset is specified to be rendered for a longer duration than at least one lower-priority value individual prioritized video frame of the prioritized video frame subset.

17. The computer program product of claim 14, where different alternative video streams associated with the video content each encode a different prioritized video frame subset of individual prioritized video frames of the video content according to a different accelerated frame rate, and the computer readable program code when executed on the computer further causes the computer to:
 select one of the alternative video streams that comprises the determined prioritized video frame subset; and
 decode the selected one of the alternative video streams that comprises the prioritized video frame subset of the individual prioritized video frames.

18. The computer program product of claim 14, where, in causing the computer to identify the assigned encoded accelerated frame rate decoding priority data values of the individual prioritized video frames of the video content, the computer readable program code when executed on the computer causes the computer to identify the assigned encoded accelerated frame rate decoding priority data values within one of:
 a digital elementary packetized stream of the video content that comprises the individual prioritized video frames; or
 a separate video frame priority encoding file associated with the video content.

19. The computer program product of claim 14, where, in causing the computer to determine, based upon the differences among the assigned encoded accelerated frame rate decoding priority data values and the selected accelerated frame rate, the prioritized video frame subset of the individual prioritized video frames of the video content to decode that yields the maximized cumulative set of the assigned encoded accelerated frame rate decoding priority data values, the computer readable program code when executed on the computer causes the computer to:
 specify, as a frame decoding metric, a rendering priority threshold value based upon the selected accelerated frame rate; and
 select the prioritized video frame subset as a collection of the individual prioritized video frames with assigned encoded accelerated frame rate decoding priority data values at least equal to the specified rendering priority threshold value that yields the maximized cumulative set of the assigned encoded accelerated frame rate decoding priority data values.

20. The computer program product of claim 14, where different subsets of intracoded frames (I-Frames) of the video content are specified for decoding at different accelerated frame rates according to differences among the encoded accelerated frame rate decoding priority data values.

* * * * *